3,246,014
OPTIONALLY 6-METHYLATED 17α-ALKYNYL-17β-OXYGENATED-2-OXA-5α-ANDROSTAN-3-ONES, 19-NOR COMPOUNDS CORRESPONDING, AND Δ⁴ AND Δ⁵⁽¹⁰⁾ DERIVATIVES THEREOF
Christopher Jung, Morton Grove, and Raphael Pappo, Skokie, Ill., assignors to G. D. Searle & Co., Chicago, Ill., a corporation of Delaware
No Drawing. Filed Feb. 27, 1964, Ser. No. 347,696
9 Claims. (Cl. 260—343.2)

This application is a continuation-in-part of our copending application Serial No. 213,851, filed August 1, 1962, and now abandoned.

The present invention is concerned with steroidal lactones of the androstane series and, more particularly, with A-ring lactones wherein the 17-position is substituted by an alkynyl and an oxygenated function, the ring system may be saturated or contain an olefinic linkage between carbon atom 5 and an adjacent carbon atom, and the 6 and 10 carbon atoms are optionally methylated. Those novel compounds can be represented by the following structural formula

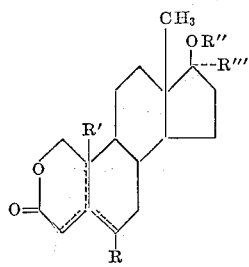

wherein R and R' can be either hydrogen or a methyl radical, R" is hydrogen or a radical of the formula

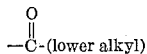

R''' can be a lower alkynyl or lower alkenyl radical, and the dotted lines indicate the optional presence of a double bond between carbon atom 5 and an adjacent carbon atom.

The lower alkynyl radicals represented in the foregoing structural formula are typified by ethynyl, propynyl, butynyl, pentynyl, hexynyl, and the branched-chain groups isomeric therewith.

Representative of the lower alkyl radicals encompassed in the R" term are methyl, ethyl, propyl, butyl, pentyl, hexyl, and the branched-chain isomers thereof.

Starting materials suitable for utilization in the manufacture of the compounds of this invention are compounds of the following structural formula

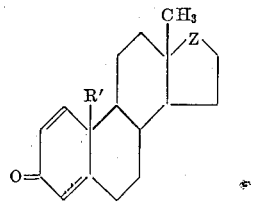

where R' is hydrogen or the methyl radical, Z can be a carbonyl, β-hydroxymethylene, or β-(lower alkanoyl)-oxymethylene, e.g. β-acetoxymethylene, radical, and the dotted line signifies the optional presence of a 4,5-double bond when R' is a methyl radical. Cleavage of the double bond of those materials results in the corresponding 1,17-dioxo-1,2-seco-A-nor compounds represented by the structural formula

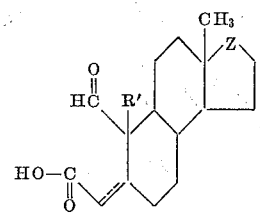

and the latter compounds are contacted with a reducing agent to afford the lactones of the structural formula

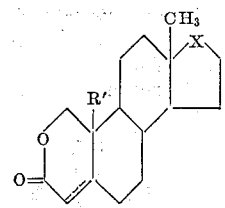

wherein X is a β-hydroxymethylene or β-(lower alkanoyl)-oxymethylene radical. The latter intermediates are converted to the alkali metal salts of the 17-keto-1,2-seco-A-nor derivatives illustrated by the following structural representation

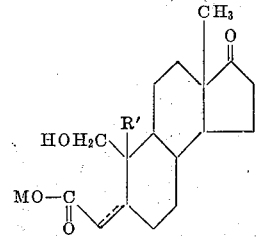

wherein M symbolizes an alkali metal cation, the oxidation and lactone cleavage steps being interchangeable. Reaction of the latter substances with a lower alkyne followed by acidification of the resulting alkali metal salt results in the instant 17α-alkynyl lactones of the structural formula

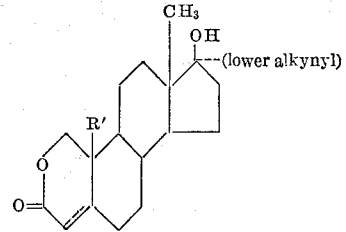

A specific example of these processes is the reaction of 5α-androst-1-ene-3,17-dione in aqueous acetic acid with lead tetraacetate and osmium tetroxide to yield 1,17-dioxo-1,2-seco-A-nor-5α-androstan-2-oic acid, which substance is contacted with sodium borohydride in aqueous sodium hydroxide to produce 17β-hydroxy-2-oxa-5α-androstan-3-one. Oxidation of the latter compound with aqueous chromic acid in acetone results in 2-oxa-5α-androstane-3,17-dione, the reaction of which with methanolic potassium hydroxide, then with acetylene and potassium tertiary-butoxide in tertiary-butyl alcohol affords 17α-ethynyl-17β-hydroxy-2-oxa-5α-androstan-3-one. In a similar manner, 5α-estr-1-ene-3,17-dione is converted to 17α-ethynyl-17β-hydroxy-2-oxa-5α-estran-3-one.

An alternate route to the instant 4,5-dehydro substances utilizes starting materials of the formula

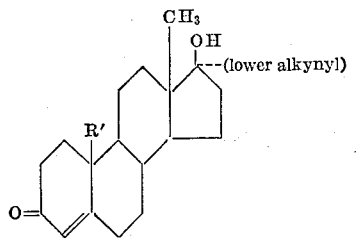

wherein R' can be hydrogen or the methyl radical. Dehydrogenation, suitably with 2,3-dichloro-4,5-dicyanobenzoquinone, affords the intermediate 1,4-dienes, which are hydroxylated with osmium tetroxide to yield the corresponding 1,2-diols. Cleavage with lead tetraacetate produces the 1,2-seco-A-nor-5α-androst-3-en-2-oic acids, represented by the structural formula

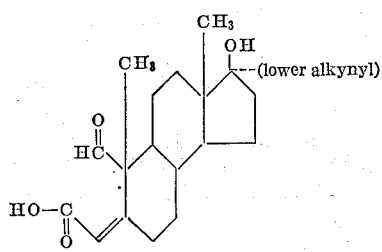

Reaction of those intermediates with a suitable reducing agent affords the 4,5-dehydro lactones of this invention. A specific illustration of the latter processes is the reaction of 17α-ethynyl-17β-hydroxyandrost-4-en-3-one with 2,3-dichloro-4,5-dicyanobenzoquinone to yield 17α-ethynyl-17βhydroxyandrosta - 1,4 - dien-3-one. Reaction of that substance in pyridine with osmium tetroxide affords 17α-ethynyl-1,2,17β-trihydroxyandrost-4-en-3-one, which compound is cleaved with lead tetraacetate, resulting in 17α-ethynyl-17β-hydroxy-1-oxo - 1,2, - seco-A-nor-5α-androst-3-en-2-oic acid. This intermediate is allowed to react in chloroform with aqueous sodium borohydride, thus providing 17α-ethynyl - 17β-hydroxy-2-oxaandrost-4-en-3-one.

The 6-methylated compounds of the present invention are conveniently obtained from 6-methyl-3,17-diketo compounds of the formula

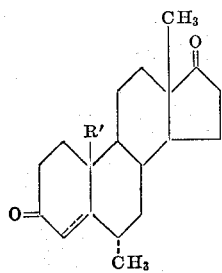

wherein R' and the dotted line have the identical meanings indicated hereinbefore. Reaction of those starting materials with an alkyl orthoformate in the presence of a lower alkanol, typically ethyl orthoformate and ethanol, results in the corresponding enol ethers, for example, the enol ethyl ether. Addition of a lower alkyne to the latter intermediates by the processes described hereinbefore results in the 6α-methyl-17α-alkynyl compounds of the structural formula

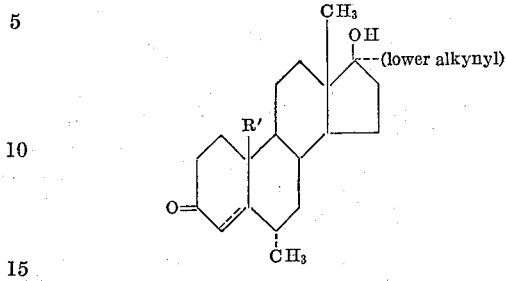

Dehydrogenation of those intermediates, for example with 2,3-dichloro-4,5-dicyanobenzoquinone, affords the corresponding 1,2-dehydro substances, which are subjected to the aforementioned cleavage and reduction processes to produce the instant 6-methyl compounds, illustrated by the following structural formula

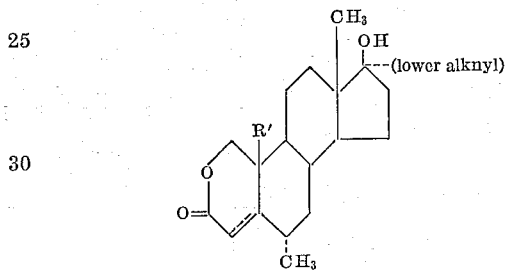

A process particularly suitable for the production of the instant estrene derivatives, i.e., those substances lacking an angular methyl group at carbon 10, but containing an annular olefinic linkage, involves the use of starting materials of the structural formula

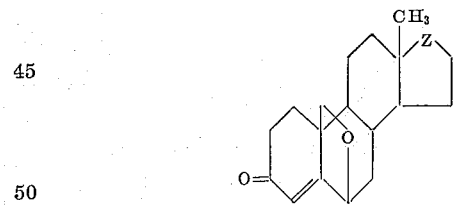

wherein Z can be a carbonyl, β-hydroxymethylene, or β-(lower alkanoyl)oxymethylene radical, e.g., β-acetoxymethylene. For example, 6β,19-epoxyandrost-4-ene-3,17-dione is dehydrogenated by heating with dichlorodicyanoquinone to afford the corresponding 1,4-diene. Hydroxylation of the 1,2-double bond with potassium chlorate in the presence of osmium tetroxide followed by cleavage of the resulting 1,2-diol with lead tetraacetate yields 6β,19-epoxy - 1,17 - dioxo-1,2-seco-A-norandrost-3-en-2-oic acid. Reduction of that aldehydro acid with sodium borohydride followed by acidification and heating affords 6β,19 - epoxy-17β-hydroxy-2-oxaandrost-4-en-3-one. Oxidation of the 17-hydroxy function with aqueous chromic acid followed by cleavage of the 6β,19-epoxy function by means of zinc and cupric acetate affords 19-hydroxy-2-oxaandrost-4-ene-3,17-dione together with the corresponding Δ⁵ substance. That Δ⁵ compound can be converted to the Δ⁴ isomer by heating with zinc acetate in aqueous acetic acid. Oxidation of the latter Δ⁴ substance with aqueous chromic acid and decarboxylation of the resulting 10β-carboxy intermediate by heating with pyridine yields 2-oxaestr-5(10)-ene-3,17-dione. Reduction of that diketo compound, followed by methylation of the 3-hydroxy group with methyl alcohol and p-toluenesulfonic acid, then oxidation of the 17-hydroxy group with aqueous chromic acid results in 3-methoxy-2-oxaestr-5(10)-en-17-one. Ethynylation of the 17-keto group by reaction with acetylene and potassium tertiary-butoxide followed by heating with p-toluenesulfonic acid in tetrahydrofuran to cleave the 3-methoxy function, then reaction with aqueous chromic acid to oxidize the resulting 3-hydroxy group produces the instant 17α-ethynyl-17β-hydroxy-2-oxaestr-5(10)-en-3-one. The instant 2-oxaestr-5(10)-en-3-ones can be converted to the corresponding Δ⁴ derivatives by reaction with potassium tertiary-butoxide in tertiary-butyl alcohol followed by cyclization of the resulting Δ⁴ hydroxy-acid. Thus, 17α-ethynyl-17β-hydroxy-2-oxaestr-5(10)-en-3-one in tertiary-butyl alcohol is contacted with potassium tertiary-butoxide to produce trans-17α-ethynyl-1,17β-dihydroxy-1,2-seco-A-norestr-3-en-2-oic acid. That seco compound is heated in carbon tetrachloride solution while being irradiated with ultraviolet light, thus producing 17α-ethynyl-17β-hydroxy-2-oxaestr-4-en-3-one. The trans nomenclature, in this instance, refers to the relative positions of carbon atoms 1 and 3.

The 17β-(lower alkanoyl)oxy compounds of this invention are conveniently obtained by acylation of the instant 17β-ols. For example, 17α-ethynyl-17β-hydroxy-2-oxa-5α-androstan-3-one is heated with acetic anhydride and pyridine to produce 17β-acetoxy-17α-ethynyl-2-oxa-5α-androstan-3-one.

The instant 17α-(lower alkenyl) compounds are conveniently produced by partial catalytic hydrogenation of the corresponding 17α-(lower alkynyl) substances. A pyridine solution of 17α-ethynyl-17β-hydroxy-2-oxaandrostan-3-one, for example, is stirred with hydrogen and a 5% palladium-on-carbon catalyst at atmospheric pressure and room temperature to yield 17β-hydroxy-2-oxa-17α-vinylandrostan-3-one. A process particularly suitable for the manufacture of the 17α-(lower alkenyl) derivatives of the estrene series involves reaction of the aforementioned 17α-(lower alkynyl)-6β,19-epoxy substances with zinc, suitably in the presence of cupric acetate. Thus, 6β,19-epoxy-17α-ethynyl-17β-hydroxy-2-oxaandrost-4-en-3-one in aqueous ethanol containing acetic acid is heated with zinc and cupric acetate to afford 17β,19-dihydroxy-2-oxa-17α-vinylandrost-4-en-3-one. Oxidation of the latter substance with aqueous chromic acid followed by decarboxylation of the resulting 10β-carboxy intermediate by heating with pyridine results in 17β-hydroxy-2-oxa-17α-vinyl-estr-5(10)-en-3-one.

The compounds of the present invention display valuable pharmacological properties. They are, for example, hormonal agents as is evidenced by their progestational activity.

The following examples describe in detail certain of the compounds illustrative of the present invention and methods which have been devised for their manufacture. The invention, however, is not to be construed as limited thereby either in spirit or in scope since it will be apparent to those skilled in the art that many modifications both of materials and of methods may be practiced without departing from the purpose and intent of the disclosure. In the examples hereinbefore detailed, temperatures are given in degrees centigrade (° C.) and quantities of materials in parts by weight except as otherwise noted.

*Example 1*

To a solution of 8 parts of 5α-androst-1-ene-3,17-dione in 120 parts of acetic acid containing 15 parts of water is added 50 parts of lead tetracetate and 0.75 part of osmium tetroxide. This reaction mixture is stirred for about 4 hours at room temperature, then is stored at room temperature for about 16 hours and finally is extracted with benzene. The benzene solution is washed with water and extracted with aqueous potassium bicarbonate. The aqueous extracts are acidified with dilute hydrochloric acid, then are extracted with a mixture of ethyl acetate and benzene. This organic extract is washed with water, dried over anhydrous sodium sulfate, and evaporated to dryness at reduced pressure. The resulting residue is dissolved in 20 parts of pyridine, then is treated with 10 parts of 20% aqueous sodium bisulfite. This mixture is stirred for about 20 minutes at room temperature, then is diluted with water and extracted with ethyl acetate. The aqueous layer is separated and acidified by means of dilute sulfuric acid, and this acidic mixture is extracted with benzene. The benzene solution is washed with water, dried over anhydrous sodium sulfate, and concentrated to dryness in vacuo to afford 1,17-dioxo-1,2-seco-A-nor-5α-androstan-2-oic acid.

To a solution of 2 parts of 1,17-dioxo-1,2-seco-A-nor-5α-androstan-2-oic acid in 20 parts of water containing 4 parts of 20% aqueous sodium hydroxide is added a solution of 10 parts of sodium borohydride and 80 parts of water. This mixture is stored at room temperature for about 24 hours, then is washed with ether and acidified with aqueous hydrochloric acid. The resulting mixture is extracted with ethyl acetate-ether, and the organic layer is separated, washed successively with aqueous potassium carbonate and water, dried over anhydrous sodium sulfate, then evaporated to dryness at reduced pressure. The crystalline residue is triturated with ether, then is recrystallized from butanone to afford pure 17β-hydroxy-2-oxa-5α-androstan-3-one, M.P. about 198–203°.

To a solution of 3 parts of 17β-hydroxy-2-oxa-5α-androstan-3-one in 40 parts of acetone is added dropwise 3 parts by volume of an aqueous solution, 8 N in chromium trioxide and 8 N in sulfuric acid. The mixture is allowed to stand at room temperature for about 3 minutes then is treated with isopropyl alcohol to destroy excess oxidizing agent, and is finally evaporated to dryness in an atmosphere of nitrogen. The residue is extracted with ether-benzene, and the resulting organic solution is washed successively with water, dilute hydrochloric acid, dilute aqueous sodium hydroxide, and water, then is dried over anhydrous sodium sulfate, finally is concentrated to dryness in vacuo, resulting in crystals of 2-oxa-5α-androstane-3,17-dione, M.P. about 172–173°. Recrystallization from methylcyclohexane-benzene affords a sample melting at about 173–174°.

*Example 2*

To a solution of 0.5 part of potassium hydroxide and 24 parts of methanol is added 2 parts of 2-oxa-5α-androstane-3,17-dione, and the resulting reaction mixture is stirred at room temperature for about 2 hours. Distillation of the solvent at reduced pressure affords a residue containing the potassium salt of 1-hydroxy-17-oxa-1,2-seco-A-nor-5α-androstan-2-oic acid.

A mixture of 48 parts of potassium tertiary-butoxide and 234 parts of tertiary-butyl alcohol is warmed to effect solution, then is cooled to room temperature, at which time a stream of acetylene is passed through this mixture for about 2 hours. To that alkaline mixture is then added 2.8 parts of the crude potassium salt of 1-hydroxy-17 - oxo - 1,2 - seco - A - nor - 5α - androstan - 2 - oic acid, and stirring is continued at a temperature of about 10° for about 3½ hours while the addition of acetylene is continued. At the end of the reaction period, aqueous ammonium chloride is added and the volatile materials are removed by distillation. Dilution with water affords an aqueous solution which is extracted with ether. The aqueous layer is separated, made acidic with acetic acid, allowed to stand at room temperature for about 12 hours, then is extracted with chloroform. The organic extract is washed successively with dilute aqueous potassium carbonate and water, then is dried over anhydrous sodium sulfate and concentrated to dryness at reduced pressure. Recrystallization of the residue from acetone yields pure 17α - ethynyl - 17β - hydroxy - 2 - oxa - 5α - androstan- 3-one, melting at about 289–290°. It is characterized further by the structural formula

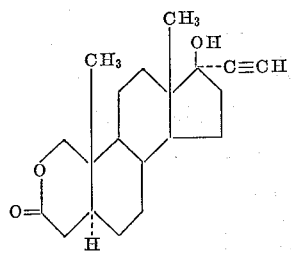

*Example 3*

The substitution of an equivalent quantity of propyne in the procedure of Example 2 results in 17β-hydroxy-17α - propynyl - 2 - oxa - 5α - androstan - 3 - one of the structural formula

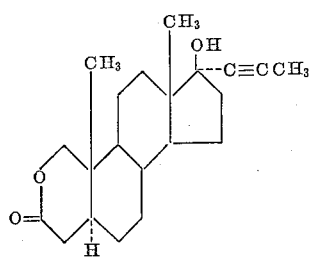

*Example 4*

A mixture of 200 parts of 17α-ethynyl-17β-hydroxyandrost - 4 - en - 3 - one, 172 parts of 2,3-dichloro-4,5-dicyanobenzoquinone and 3605 parts of dioxane is heated at the reflux temperature with stirring in an atmosphere of nitrogen for a period of about 20 hours. The reaction mixture is cooled to room temperature, filtered, then stripped of solvent at reduced pressure. The resulting residue is extracted with chloroform, and this organic extract is washed successively with aqueous sodium sulfite, aqueous sodium hydroxide, and water, then is dried over anhydrous sodium sulfate, and stripped of solvent at reduced pressure. The residue is dissolved in 1250 parts of pyridine; a solution of 125 parts of sodium bisulfite in 1689 parts of water is added, and the resulting mixture is stirred at room temperature for about 20 minutes, then is diluted with water and extracted with benzene. The benzene extract is washed successively with hydrochloric acid, water, and aqueous potassium bicarbonate, then is dried over anhydrous sodium sulfate. The solvent is removed by distillation and the resulting residue is redissolved in benzene, then is stirred with aluminum silicate for several minutes and filtered. Distillation of the solvent at reduced pressure affords a crystalline residue, the trituration of which with benzene yields 17α-ethynyl-17β-hydroxyandrosta-1,4-dien-3-one, melting at about 236.5–240°.

*Example 5*

The substitution of 209 parts of 17β-hydroxy-17α-propynylandrost-4-en-3-one in the procedure of Example 4 results in 17β-hydroxy-17α-propynylandrosta-1,4-dien-3-one.

*Example 6*

To a solution of 39 parts of 17α-ethynyl-17β-hydroxyandrosta-1,4-dien-3-one in 275 parts of pyridine is added, with cooling, a solution of 35 parts of osmium tetroxide in 238 parts of pyridine, and the resulting reaction mixture is stored at room temperature for about 5 days. A solution of 63 parts of sodium bisulfite and 686 parts of pyridine in 1050 parts of water is added, and this mixture is stirred at room temperature for about 30 minutes, then is diluted with water and extracted with chloroform. The chloroform solution is washed successively with water, dilute aqueous hydrochloric acid, and water, then is treated with hydrogen sulfide gas for about 1½ hours. Distillation of the chloroform at reduced pressure affords a residue which is extracted with benzene. The benzene extract is kept at room temperature for about 24 hours, then is filtered. The filtrate is partially concentrated, then is allowed to stand at room temperature for several days. The black crystals which initially appear are removed by filtration, and the filtrate is concentrated to dryness at reduced pressure to afford a residue containing 17α-ethynyl-1,2,17β-trihydroxyandrost-4-en-3-one.

To a solution of the latter residue in 233 parts of acetic acid containing 24 parts of water is added 49 parts of lead tetracetate, and the resulting reaction mixture is heated at about 60°, under reduced pressure, for about 15 minutes. Stirring is continued at 60° and at atmospheric pressure for about one hour, at the end of which time water is added, and the resulting aqueous mixture is extracted with chloroform. The chloroform solution is washed with dilute aqueous potassium carbonate, then is extracted with dilute aqueous sodium hydroxide. The latter extract is made acidic with dilute hydrochloric acid, and the resulting precipitate is collected by filtration, then is extracted with chloroform. This chloroform layer is separated, then is washed with dilute aqueous potassium carbonate, dried over anhydrous sodium sulfate, and stripped of solvent at reduced pressure. Recrystallization of the resulting residue from acetone affords 17α-ethynyl-17β-hydroxy-1-oxo-1,2-seco-A-norandrost-3-en-2-oic acid, M.P. about 205–220°.

*Example 7*

To a solution of 0.5 part of sodium hydroxide and 5 parts of sodium borohydride in 70 parts of water is added a solution of 4.32 parts of 17α-ethynyl-17β-hydroxy-1-oxo-1,2-seco-A-norandrost-3-en-2-oic acid in 13.4 parts of chloroform, and the resulting reaction mixture is stirred at room temperature for about 3½ hours. The chloroform layer is separated and washed with dilute aqueous sodium hydroxide, then is dried over anhydrous sodium sulfate and concentrated to dryness at reduced pressure. Successive recrystallizations from benzene and isopropyl alcohol affords pure 17α-ethynyl-17β-hydroxy-2-oxaandrost-4-en-3-one, melting at about 250–251.5°. It is represented by the structural formula

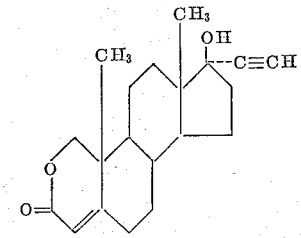

*Example 8*

By substituting 40.8 parts of 17β-hydroxy-17α-propynylandrosta-1,4-dien-3-one and otherwise proceeding according to the processes of Example 6, 17β-hydroxy-17α-propynyl-1-oxo-1,2-seco-A-norandrost-3-en-2-oic acid is obtained.

*Example 9*

The substitution of 4.5 parts of 17β-hydroxy-17α-propynyl-1-oxo-1,2-seco-A-norandrost-3-en-2-oic acid in the procedure of Example 7 results in 17β-hydroxy-17α-propynyl-2-oxaandrost-4-en-3-one, characterized by the structural formula

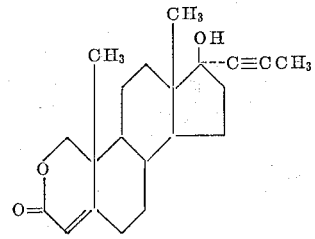

Example 10

A mixture of one part of 17α-ethynyl-17β-hydroxy-2-oxa-5α-androstan-3-one, 10 parts of acetic anhydride, and 20 parts of pyridine is heated on the steam bath for about 4 hours, then is cooled and diluted with water. The resulting aqueous mixture is extracted with benzene, and the organic layer is washed with water, dried over anhydrous sodium sulfate and concentrated to dryness at reduced pressure. Recrystallization from hexane yields pure 17β-acetoxy-17α-ethynyl-2-oxa-5α-androstan-3-one, characterized by the structural formula

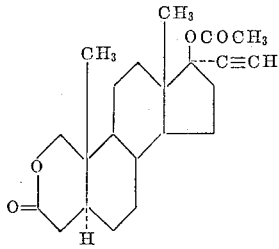

Example 11

The reaction of one part of 17β-hydroxy-17α-propynyl-2-oxaandrost-4-en-3-one, 13 parts of propionic anhydride, and 20 parts of pyridine by the procedure of Example 10 results in 17β-propionoxy-17α-propynyl-2-oxaandrost-4-en-3-one of the structural formula

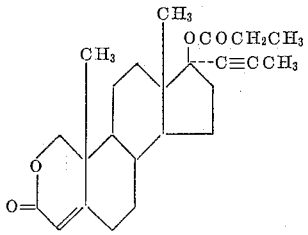

Example 12

To a solution of 67 parts of 6β,19-epoxyandrost-4-ene-3,17-dione in 2200 parts of benzene is added 67 parts of dichlorodicyanobenzoquinone and 1.09 parts of p-toluenesulfonic acid, and the resulting reaction mixture is heated in a nitrogen atmosphere at the reflux temperature with stirring for about 19 hours. The mixture is then cooled and filtered, and the filtrate is evaporated to a small volume, then is washed successively with dilute aqueous sodium sulfite, dilute aqueous sodium hydroxide, and water, dried over anhydrous sodium sulfate, and stripped of solvent at reduced pressure. The resulting solid residue is dissolved in benzene, and that organic solution is passed through a column of aluminum silicate. Removal of the solvent by distillation at reduced pressure and crystallization of the resulting residue from isopropyl alcohol yields 6β,19-epoxyandrosta-1,4-diene-2,17-dione, melting at about 164.5–166.5°. A pure sample, melting at about 167.5–169.5°, is obtained by further recrystallization, from benzene.

Example 13

To a solution of 50 parts of 6β,19-epoxyandrosta-1,4-diene-3,17-dione in 546 parts of tertiary-butyl alcohol is added 8.5 parts of potassium chlorate, 4.25 parts of osmium tetroxide, and 700 parts of water. The resulting reaction mixture is allowed to stand at room temperature for about 11 days, at the end of which time 0.5 part of potassium chlorate is added, and the mixture is stirred at 0–5° for about 3 hours. The crystalline product which separates from the mixture is collected by filtration and dried to afford 6β,19-epoxy-1,2-dihydroxyandrost-4-ene-3,17-dione, melting at about 243–246° with decomposition.

Concentration of the latter filtrate to approximately ⅓ volume results in the separation of additional crystalline material. These crystals are collected by filtration and washed on the filter with benzene to yield additional crude product, melting at about 230–235°. A further quantity of crude product is obtained from the latter filtrate by dilution with chloroform, washing of that organic solution successively with dilute aqueous sodium hydroxide and water, drying over anhydrous sodium sulfate, and removal of the solvent by distillation at reduced pressure. The crystalline residue obtained in that manner is washed with benzene to afford the crude 1,2-diol, melting at about 227–233°.

Example 14

To a solution of 44 parts of 6β,19-epoxy-1,2-dihydroxyandrost-4-ene-3,17-dione in 739 parts of acetic acid containing 176 parts of water is added 202 parts of lead tetraacetate, and the temperature is maintained below 56° by cooling. When the exothermic reaction has subsided, the reaction mixture is heated at 50–56° for about 1½ hours, then is cooled to room temperature, and 2.4 parts of formic acid is added in order to decompose excess lead tetraacetate. Removal of the solvent by distillation at reduced pressure affords a residue which is partitioned between water and chloroform. The organic layer is separated, then is washed with water, dried over anhydrous sodium sulfate and concentrated to dryness at reduced pressure. Crystallization of the residue from benzene affords the solvated crude product, which displays a double melting point at about 130–135° and 228–233°. Recrystallization from ethyl acetate affords pure 6β,19-epoxy-1,17-dioxo-1,2-seco-A-norandrost-3-en-2-oic acid, which displays a melting point at about 222–224.5°.

Example 15

To a solution of 40 parts of 6β,19-epoxy-1,17-dioxo-1,2-seco-A-norandrost-3-en-2-oic acid in 456 parts of chloroform is added at 0–5°, a solution of 26 parts of sodium borohydride in 312 parts of water. The resulting reaction mixture is stirred at room temperature for about 4 hours, then is diluted with water. The aqueous layer contains the sodium salt of 6β,19-epoxy-1,17-dihydroxy-1,2-seco-A-norandrost-3-en-2-oic acid, and that hydroxy acid is precipitated by acidification of the aqueous solution with hydrochloric acid. That precipitate is isolated by filtration and recrystallized from pyridine-ether, thus affording 6β,19-epoxy-1,17β-dihydroxy-1,2-seco-A-norandrost-3-en-2-oic acid, which melts at about 188–191°, resolidifies and melts again at about 204–207°.

The aqueous solution containing the sodium salt of the hydroxy acid can be used directly to obtain the corresponding lactone. Thus, that solution is diluted with 200 parts of water and 240 parts of concentrated hydrochloric acid, then is heated at 90–100° for about 30 minutes. Cooling of this reaction mixture followed by extraction with chloroform affords an organic solution which is washed with water, dried over anhydrous sodium sulfate, and concentrated to dryness at reduced pressure. The partially crystalline residue is triturated with hot benzene to yield 6β,19-epoxy-17β-hydroxy-2-oxaandrost-4-en-3-one, melting at about 207–209.5°.

Example 16

To a solution of 26.8 parts of 6β,19-epoxy-17β-hydroxy-2-oxaandrost-4-en-3-one in 560 parts of acetone is added 27 parts by volume of an aqueous solution, 8 N in chromium trioxide and 8 N in sulfuric acid, at such a rate that the temperature is maintained at about room temperature. The resulting reaction mixture is stirred at room temperature for about 7 minutes after addition has been completed, after which time isopropyl alcohol is added in order to destroy the excess oxidant. Removal of the solvent by distillation at reduced pressure affords a residue which is extracted with chloroform. The organic layer is separated, washed successively with aqueous potassium bicarbonate and water, then dried over anhydrous sodium sulfate and concentrated to dryness at reduced pressure.

Recrystallization of the resulting residue from isopropyl alcohol affords pure 6β,19-epoxy-2-oxaandrost-4-ene-3,17-dione, melting at about 197–200°.

*Example 17*

To a solution of 22.35 parts of 6β,19-epoxy-2-oxaandrost-4-ene-3,17-dione in 1196 parts of ethanol containing 462 parts of acetic acid and 440 parts of water is added successively 220 parts of zinc dust and 44 parts of cupric acetate. The resulting reaction mixture is heated at the reflux temperature for about 3 hours, then is cooled and filtered. The organic solvent is removed by distillation at reduced pressure, and the crystals which form are separated by filtration and washed on the filter with hot chloroform. The washings and original filtrate are combined, and the layers are separated. The organic layer is washed with water, dried over anhydrous sodium sulfate and stripped of solvent at reduced pressure. The residue thus obtained is dissolved in methanol with the aid of heating, and the resulting solution is cooled to room temperature, then is mixed with a solution of 4.4 parts of sodium hydroxide in 20 parts of water. At the end of about 4 minutes, a solution of 15 parts of potassium bicarbonate in 100 parts of water is added, and the mixture is partially concentrated under reduced pressure. The addition of a solution of 44 parts of potassium bicarbonate in 800 parts of water results in separation of a precipitate which is extracted with chloroform. The chloroform extract is washed with water, dried over anhydrous sodium sulfate and concentrated to dryness at reduced pressure. Recrystallization of that residue from ethyl acetate affords 19-hydroxy-2-oxaandrost-4-ene-3,17-dione, melting at about 231–234°.

The aqueous alkaline layer obtained as a result of the chloroform extraction described in the previous paragraph is acidified with hydrochloric acid, and that acidic solution is extracted with chloroform. The resulting organic layer is washed with water, dried over anhydrous sodium sulfate and concentrated to dryness at reduced pressure. Recrystallization of the resulting crystalline residue from methylene chloride-ethyl acetate affords pure 19-hydroxy-2-oxaandrost-5-ene-3,17-dione, melting at about 186–189°.

*Example 18*

To a solution of 6 parts of 19-hydroxy-2-oxaandrost-4-ene-3,17-dione in 600 parts of acetone is added, at 0–5° with stirring, 15 parts by volume of an aqueous solution, 8 N in chromium trioxide and 8 N in sulfuric acid. The addition requires about 5 minutes. Stirring is continued at 0–5° for about one hour longer, after which time 5.6 parts of isopropyl alcohol is added in order to destroy the excess reagent. The solvent is removed by distillation at room temperature under reduced pressure, and the residue thus obtained is partitioned between chloroform and water. The chloroform layer is separated, washed with water, dried over anhydrous sodium sulfate, and concentrated to dryness under reduced pressure. Crystallization of that residue from benzene yields solvated 10β-carboxyl-2-oxaestr-4-ene-3,17-dione, melting at about 105° with decomposition. Recrystallization from ethyl acetate affords pure 10β-carboxy-2-oxaestr-4-ene-3,17-dione, which melts at about 177–183° with decomposition.

*Example 19*

A solution containing 1.54 parts of the benzene solvate of 10β-carboxy-2-oxaestr-4-ene-3,17-dione, obtained by the procedure of the preceding example, in 15 parts of pyridine is heated on the steam bath, in a nitrogen atmosphere, for about one hour. Removal of the solvent by distillation at reduced pressure affords a residue which is extracted with benzene. The benzene extract is washed successively with cold hydrochloric acid, water, dilute aqueous potassium bicarbonate, and water, then is stripped of solvent by distillation at reduced pressure. Recrystallization of the residue thus obtained from ether-benzene affords pure 2-oxaestr-5(10)-ene-3,17-dione, melting at about 123–126°, while recrystallization from isopropyl alcohol affords a different crystalline modification of that substance, which displays a melting point at about 132–133.5°.

*Example 20*

To a solution of one part of 2-oxaestr-5(10)-ene-3,17-dione in 87 parts of toluene is added dropwise, at about −70° in a nitrogen atmosphere over a period of about 7 minutes, 12 parts by volume of a 1.2 Molar solution of diisobutyl aluminum hydride in toluene. The reaction mixture is stirred for about one hour longer, then is allowed to stand at about −70° for an additional 3 hours. At the end of that time, approximately 10 parts of a 1:10 methanol-toluene solution and excess aqueous sodium potassium tartrate are successively added. The temperature is allowed to rise to room temperature, and the mixture is filtered in order to remove inorganic salts. The filter cake is washed with chloroform, and the original filtrate and washings are combined. Washing of that organic solution with water followed by drying over anhydrous sodium sulfate and distillation at reduced pressure results in a gummy residue, which is a mixture of the 3α and 3β epimers of 2-oxaestr-5(10)-ene-3,17β-diol.

*Example 21*

The mixture of epimeric diols obtained according to the preceding example is dissolved in 160 parts of methanol, and 0.1 part of p-toluenesulfonic acid is added to that solution. That reaction mixture is stored at room temperature for about 24 hours, then is diluted with a solution of 0.3 part of sodium hydroxide in 16 parts of methanol. Removal of the solvent by distillation at reduced pressure and room temperature affords a residue which is extracted with benzene. The benzene extract is washed with water, dried over anhydrous sodium sulfate and stripped of solvent at reduced pressure to afford a mixture containing the 3α and 3β epimers of 3-methoxy-2-oxaestr-5(10)-en-17β-ol.

*Example 22*

The mixture of 3-methoxy epimers obtained according to the preceding example is dissolved in 15 parts of pyridine, and the resulting solution is added to a mixture of 1.5 parts of chromium trioxide in 15 parts of pyridine. That reaction mixture is kept at room temperature for about 15 hours, then is cooled to 0–5°, diluted with a solution of benzene and ether, and filtered. The organic filtrate is washed successively with cold aqueous sodium hydroxide and water, then is dried by means of anhydrous sodium sulfate, and is concentrated under reduced pressure to afford a solid residue. That residue is dissolved in 12 parts of methanol, to which solution is added 0.3 part of sodium hydroxide dissolved in 4 parts of water. That reaction mixture is heated at about 50° for about 10 minutes, then is stripped of solvent at reduced pressure, and the residue which results is diluted with water and extracted with a benzene-ether mixture. The organic extract is concentrated to dryness under reduced pressure to afford a partially crystalline residue containing the 3α and 3β epimers of 3-methoxy-2-oxaestr-5(10)-en-17-one.

*Example 23*

Into a solution of 1.6 parts of potassium metal in 14 parts of ether containing 25.3 parts of tertiary-amyl alcohol, at 0–5°, is bubbled acetylene gas for about one hour. At the end of that time, 0.81 part of the epimeric mixture of 3-methoxy-2-oxaestr-5(10)-en-17-one obtained according to the preceding example is added, and the resulting reaction mixture is stirred at 0–5° for about 4½ hours, during which time the addition of acetylene is continued. At the end of that reaction period, the mixture is allowed to stand at 0–5° for about 16 hours. A solution of 2.5 parts of ammonium chloride in 26 parts of water is added, and the organic solvent is removed by concentration to a small volume. The resulting aqueous layer is extracted with a mixture of benzene and ether, and the organic extract is separated, washed with water, dried over anhydrous sodium sulfate, and concentrated to dryness under reduced pressure to produce a mixture containing the 3α and 3β epimers of 17α-ethynyl-3-methoxy-2-oxaestr-5(10)-en-17β-ol.

*Example 24*

To a solution of 0.78 part of the epimeric mixture of 17α - ethynyl - 3-methoxy-2-oxaestr-5(10)-en-17β-ol, prepared according to the procedure of the preceding example, in 148 parts of tetrahydrofuran containing 53 parts of water is added 0.78 part of p-toluenesulfonic acid. The resulting reaction mixture is slowly distilled, in a nitrogen atmosphere, for a period of about 45 minutes, to approximately one-third the original volume. The residual mixture is cooled to 0–5°, and a solution of 0.22 part of sodium hydroxide in 10 parts of water is added. Most of the organic solvent is removed by concentration of the mixture under reduced pressure, and the residual aqueous solution is extracted with chloroform. The chloroform extract is washed with water, dried over anhydrous sodium sulfate, and concentrated to dryness under reduced pressure, thus resulting in a mixture of the 3α and 3β epimers of 17α-ethynyl-2-oxaestr-5(10)-ene-3,17β-diol.

*Example 25*

To a solution of the epimeric mixture of 17α-ethynyl-2-oxaestr-5(10)-ene-3,17β-diol, obtained according to the processes described in the preceding example, in 28 parts of acetone is added, at 0–5°, 1.3 parts by volume of an aqueous solution, 8 N in chromium trioxide and 8 N in sulfuric acid. The resulting reaction mixture is stirred for about 3 minutes, after which time isopropyl alcohol is added in order to destroy the excess oxidant. Concentration to a small volume affords a residual mixture which is partitioned between water and chloroform. The layers are separated, and the chloroform layer is washed with water, dried over anhydrous sodium sulfate and stripped of solvent by distillation at reduced pressure. The resulting solid residue is dissolved in 14.4 parts of methanol, and a solution of 0.3 part of sodium hydroxide in 4 parts of water is added. That reaction mixture is heated on the steam bath for about 5 minutes, then is allowed to stand at room temperature for about 5 minutes. Water is added, and the methanol is removed by distillation at reduced pressure. This aqueous solution is washed with chloroform, then is acidified by means of hydrochloric acid, and the resulting acidic aqueous mixture is extracted with chloroform. This chloroform extract is washed with water, dried over anhydrous sodium sulfate and stripped of solvent at reduced pressure. The residue is purified further by dissolution in benzene, washing of the benzene successively with aqueous potassium bicarbonate and water, drying over anhydrous sodium sulfate and stripping of the solvent by distillation at reduced pressure. Crystallization of the resulting residue from the ether affords 17α-ethynyl-17β-hydroxy-2-oxaestr-5(10)-en-3-one, melting at about 164.5–171°. A pure sample, obtained by recrystallization from benzene, displays a melting point at about 172–177°. This substance can be represented by the following structural formula

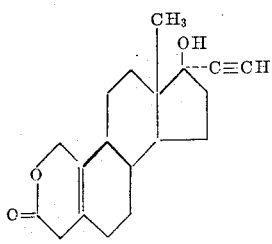

*Example 26*

To a solution of one part of 6β,19-epoxy-2-oxaandrost-4-ene-3,17-dione in 40 parts of methanol is added a solution of 0.6 part of potassium carbonate and 10 parts of water, and the resulting reaction mixture is heated at the reflux temperature for about 10 minutes, then is concentrated to dryness under reduced pressure to afford the potassium salt of 6β,19-epoxy-1-hydroxy-17-oxo-1,2-seco-A-norandrost-3-en-2-oic acid.

*Example 27*

A solution of 17.1 parts of potassium tertiary-butoxide in 72 parts of tertiary-butyl alcohol containing 24 parts of tertiary-amyl alcohol is stirred in a nitrogen atmosphere at 0–5° for about one hour, during which time acetylene gas is passed into the mixture. A solution of one part of the potassium salt of 6β,19-epoxy-1-hydroxy-17-oxo-1,2-seco-A-norandrost-3-en-2-oic acid in 80 parts of tertiary-butyl alcohol is added, and the resulting reaction mixture is stirred at 10–12° for about 24 hours, while the addition of acetylene is continued. At the end of the reaction period, the mixture is cooled to 0–5° and acidified by the addition of 24 parts of concentrated hydrochloric acid in 80 parts of water. That acidic mixture is concentrated to about ⅓ volume, after which time water and chloroform are added. The chloroform layer is separated, washed successively with dilute aqueous potassium bicarbonate and water, then dried over anhydrous sodium sulfate and stripped of solvent at reduced pressure. The resulting residue is crystallized first from benzene, then from a mixture of benzene and methylene chloride to afford 6β,19 - epoxy - 17α - ethynyl-17β-hydroxy-2-oxaandrost-4-en-3-one, melting at about 210–212°.

*Example 28*

To a solution of 2.5 parts of 6β-19-epoxy-17α-ethynyl-17β-hydroxy-2-oxaandrost-4-en-3-one in 136 parts of ethanol is added successively 25 parts of zinc dust, 5 parts of cupric acetate, 52.5 parts of acetic acid and 50 parts of water. That reaction mixture is stirred at the reflux temperature for about 2½ hours, then is cooled and filtered. The filtrate is concentrated to a small volume, then is extracted with chloroform. The organic layer is separated, washed with water, and stripped of solvent by distillation at reduced pressure to afford a gummy residue. That residue is dissolved in 26.4 parts of methanol, and the resulting solution is mixed with a solution of 1.66 parts of sodium hydroxide in 33 parts of water. After standing at room temperature for about 5 minutes, the mixture is diluted further with a solution of 16.6 parts of potassium bicarbonate in 160 parts of water, then is extracted with chloroform. Removal of the chloroform by distillation under reduced pressure affords crude 17β,19-dihydroxy-2-oxa-17α-vinylandrost-4-en-3-one, melting at about 212–221°. Trituration with boiling benzene followed by recrystallization from isopropyl alcohol affords the pure material, melting at about 207–217°.

The alkaline solution, obtained from the chloroform extraction described in the preceding paragraph, is made acidic by the addition of hydrochloric acid, and that acidic solution is extracted with chloroform. The chloroform layer is separated, and distilled to dryness under reduced pressure to afford 17β,19-dihydroxy-2-oxa-17α-vinylandrost-5-en-3-one.

*Example 29*

The substitution of an equivalent quantity of 17β,19-dihydroxy-2-oxa-17α-vinylandrost-4-en-3-one in the procedure of Example 18 results in 10β-carboxy-17β-hydroxy-2-oxa-17α-vinylestr-4-en-3-one.

*Example 30*

By substituting an equivalent quantity of 10β-carboxy-17β-hydroxy-2-oxa-17α-vinylestr-4-en-3-one and otherwise proceeding according to the processes of Example 19, 17β-hydroxy-2-oxa-17α-vinylestr-5(10)-en-3-one of the structural formula

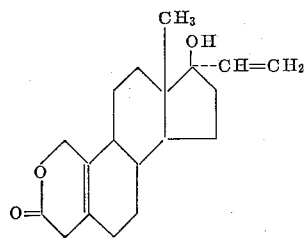

is obtained.

*Example 31*

A mixture of 3.5 parts of 6β,19-epoxy-17β-hydroxy-2-oxaandrost-4-en-3-one, 35 parts of zinc dust, 73.5 parts of acetic acid, 184 parts of ethanol, and 70 parts of water is heated at the reflux temperature for about 3 hours. At the end of that time, an additional quantity of 35 parts of zinc dust is added, and refluxing is continued for about 4½ hours longer. The reaction mixture is then cooled and filtered, and the filter cake is washed with a mixture of acetic acid, ethanol, and water. The combined filtrate and washings are concentrated to a small volume, and the resulting residue is diluted with water. Extraction of that aqueous mixture with chloroform affords an organic solution which is washed with water, dried over anhydrous sodium sulfate, and concentrated to dryness. The residue is dissolved in 24 parts of methanol, and a solution of 2 parts of sodium hydroxide in 60 parts of water is added. After standing at room temperature for about 3 minutes, the mixture is diluted with a solution of 21 parts of potassium bicarbonate in 150 parts of water. That alkaline solution is extracted with chloroform, and the choloroform layer is distilled to dryness to afford 17β,19-dihydroxy-2-oxaandrost-4-en-3-one, melting at about 245–250°. Recrystallization from chloroform affords the pure material, melting at about 248–251°.

The alkaline layer, obtained from the chloroform extraction described in the preceding paragraph, is acidified with hydrochloric acid, and that mixture is extracted with chloroform. The chloroform extract is washed with water, dried over anhydrous sodium sulfate, and evaporated to dryness under reduced pressure. The resulting residue is recrystallized from chloroform to afford 17β,19-dihydroxy-2-oxaandrost-5-en-3-one, melting at about 198–203°. A further recrystallization, from ethanol, affords the pure substance, melting at about 203–208°.

*Example 32*

To a solution of 2.6 parts of 17β,19-dihydroxy-2-oxaandrost-5-en-3-one in 1050 parts of acetic acid containing 100 parts of water and 264 parts of ethanol is added 100 parts of zinc acetate, and the resulting reaction mixture is heated at the reflux temperature, in a nitrogen atmosphere, for about 24 hours. At the end of that period of time, the reaction mixture is filtered, and the filter cake is washed with a mixture of acetic acid, water, and ethanol. The combined filtrate and washings are concentrated to a small volume, and the residual mixture is diluted with water, then extracted with chloroform. The chloroform layer is washed with water, dried over anhydrous sodium sulfate and evaporated to dryness under reduced pressure. The resulting residue is dissolved in 24 parts of methanol, and that solution is mixed with 2 parts of sodium hydroxide in 60 parts of water. After standing for several minutes at room temperature, the mixture is diluted with a solution of 21 parts of potassium bicarbonate in 150 parts of water. That alkaline solution is then extracted with chloroform; the two layers are separated; and the organic layer is concentrated to dryness at reduced pressure to afford 17β,19-dihydroxy-2-oxaandrost-4-en-3-one, melting at about 248–251°.

From the alkaline aqueous layer is obtained, by the procedure described in Example 31, some unchanged starting mterial, i.e., 17β-19,-dihydroxy-2-oxaandrost-5-en-3-one.

*Example 33*

To a solution of one part of 19-hydroxy-2-oxaandrost-4-ene-3,17-dione in 60 parts of acetone is added, at 0–5° over a period of about 5 minutes, 0.9 part by volume of an aqueous solution, 8 N in chromium trioxide and 8 N in sulfuric acid. The resulting reaction mixture is stirred at 0–5° for about 20 minutes, after which time 0.05 part of isopropyl alcohol is added in order to destroy the excess oxidant, and the mixture is concentrated at reduced pressure. To the resulting residue is added water and chloroform. The chloroform extract is washed successively with 5% aqueous potassium bicarbonate and water, then dried over anhydrous sodium sulfate and evaporated to dryness under reduced pressure to afford a crystalline residue of the crude product. Recrystallization of that solid material from isopropyl alcohol affords pure-2-oxa-19-oxoandrost-4-ene-3,17-dione, melting at about 155–159°.

*Example 34*

The substitution of an equivalent quantity of 17β-19-dihydroxy-2-oxaandrost-4-en-3-one in the procedure of Example 33 results in 2-oxa-19-oxoandrost-4-ene-3,17-dione, identical with the product of Example 33.

*Example 35*

A solution of 5.7 parts of 2-oxa-19-oxoandrost-4-ene-3,17-dione in 120 parts by volume of 5% sodium hydroxide in methanol is allowed to stand at room temperature for about 5 hours, then is diluted with water and acidified with hydrochloric acid. Extraction of that acidic solution with chloroform affords an organic layer which is washed successively with aqueous potassium carbonate and water, then dried over anhydrous sodium sulfate and stripped of solvent under reduced pressure to produce 2-oxaestr-5(10)-ene-3,17-dione.

*Example 36*

To a solution of 5.48 parts of 2-oxaestr-5(10)-ene-3,17-dione in 80 parts of methanol is added a solution of 5 parts of sodium hydroxide in 100 parts of water, and the resulting mixture is heated at about 60° for about 5 minutes, then is allowed to stand for approximately 10 minutes longer. The organic solvent is removed by distillation at reduced pressure, and 100 parts of water followed by 2.5 parts of sodium borohydride are added. The resulting reaction mixture is kept at room temperature for about 6 hours, then is made acidic by the addition of hydrochloric acid. The precipitated crude product is extracted with chloroform, and the chloroform extract is washed successively with dilute aqueous potassium bicarbonate and water, dried over anhydrous sodium sulfate and stripped of solvent by distillation at reduced pressure. Purification of the resulting crude product by recrystallization from benzene affords pure 17β-hydroxy-2-oxaestr-5(10)-en-3-one, melting at about 158–164°.

*Example 37*

To a solution of 1.5 parts of 19-hydroxy-2-oxaandrost-5-ene-3,17-dione in 100 parts of acetone is added dropwise, at 0–5° over a period of about 5 minutes, 3.8 parts by volume of an aqueous solution, 8 N in chromium trioxide and 8 N in sulfuric acid. The reaction mixture is stirred at 0–5° for about one hour, at the end of which time excess isopropyl alcohol is added in order to destroy the unreacted oxidant. The organic solvent is removed by distillation under reduced pressure, and the resulting residue is partitioned between chloroform and water. The chloroform layer is separated, washed with water, and extracted with dilute aqueous potassium bicarbonate. The alkaline extract is acidified to about pH 1 by the addition of excess hydrochloric acid, and the product is extracted into chloroform. The chloroform layer is washed with water, dried over anhydrous sodium sulfate and evaporated to dryness under reduced pressure. Recrystallization of the resulting solid residue from benzene affords pure 10β-carboxy-2-oxaestr-5-ene-3,17-dione, melting at about 204–210° with decomposition.

The product of this example can be obtained also by utilizing an equivalent quantity of 17β,19-dihydroxy-2-oxaandrost-5-en-3-one as the starting material.

Example 38

A solution of 1.15 parts of 10β-carboxy-2-oxaestr-5-ene-3,17-dione in 11 parts of pyridine is heated at 90–100° for about 3½ hours, after which time the solvent is removed by distillation at reduced pressure, and the resulting residue is extracted with chloroform. The chloroform extract is washed successively with dilute aqueous potassium bicarbonate and water, then dried over anhydrous sodium sulfate and concentrated to dryness at reduced pressure. Purification of the residue by recrystallization from isopropyl alcohol affords pure 2-oxaestr-5(10)-ene-3,17-dione, melting at about 132–133°.

Example 39

By substituting an equivalent quantity of estr-1-ene-3,17-dione and otherwise proceeding according to the processes described in Example 13, 1,2-dihydroxy-5α-estrane-3,17-dione is obtained.

Example 40

The substitution of an equivalent quantity of 1,2-dihydroxy-5α-estrane-3,17-dione in the procedure of Example 14 results in 1,17-dioxo-1,2-seco-A-nor-5α-estran-2-oic acid.

Example 41

By substituting an equivalent quantity of 1,17-dioxo-1,2-seco-A-nor-5α-estran-2-oic acid and otherwise proceeding according to the processes of Example 15, 17β-hydroxy-2-oxa-5α-estran-3-one is obtained.

Example 42

The oxidation of an equivalent quantity of 17β-hydroxy-2-oxa-5α-estran-3-one according to the procedure described in Example 16 results in 2-oxa-5α-estrane-3,17-dione.

Example 43

By submitting 2-oxa-5α-estrane-3,17-dione to the successive processes described in Example 2, the potassium salt of 1-hydroxy-17-oxo-1,2-seco-A-nor-5α-estran-2-oic acid and 17α-ethynyl-17β-hydroxy-2-oxaestran-3-one are obtained. The latter compound can be represented by the following structural formula

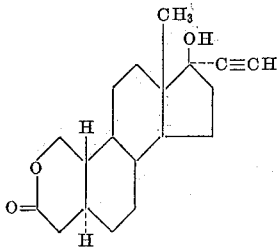

Example 44

By substituting an equivalent quantity of propyne and otherwise proceeding according to the processes described in Example 23, 3-methoxy-2-oxa-17α-propynylestr-5(10)-en-17β-ol is obtained.

Example 45

The substitution of an equivalent quantity of 3-methoxy-2-oxa-17α-propynylestr-5(10)-en-17β-ol in the procedure described in Example 24 results in 2-oxa-17α-propynylestr-5(10)-ene-3,17β-diol.

Example 46

The oxidation of an equivalent quantity of 2-oxa-17α-propynylestr-5(10)-ene-3,17β-diol by the procedure of Example 25 results in 17β-hydroxy-2-oxa-17α-propynylestr-5(10)-en-3-one of the structural formula

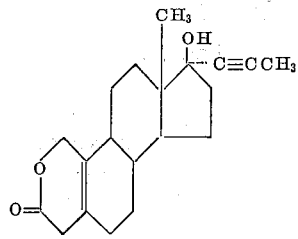

Example 47

To a solution of 7.5 parts of 2-oxaestr-5(10)-ene-3,17-dione in 160 parts of tertiary-butyl alcohol is added 10 parts of potassium tertiary-butoxide, and the resulting reaction mixture is kept at room temperature for about 1½ hours. Water and dilute hydrochloric acid are added successively, and the resulting acidic mixture is extracted with chloroform. The chloroform layer is separated, then extracted with cold aqueous potassium carbonate. The alkaline extract is acidified by means of hydrochloric acid, and that acidic mixture is extracted with chloroform. The resulting organic layer is separated, washed with water, dried over anhydrous sodium sulfate, and concentrated to dryness at reduced pressure to afford crystals of pure trans-1-hydroxy-17-oxo-1,2-seco-A-norestr-3-en-2-oic acid, melting at about 112–126°.

Example 48

A solution of 3 parts of trans-1-hydroxy-17-oxo-1,2-seco-A-norestr-3-en-2-oic acid in 160 parts of carbon tetrachloride, under nitrogen in a quartz container, is heated at the reflux temperature, while being irradiated with ultraviolet light, for about 2 hours. At the end of the reaction period, the mixture is cooled, washed successively with cold aqueous potassium carbonate and water, dried over anhydrous sodium sulfate and evaporated to dryness to afford 2-oxaestr-4-ene-3,17-dione, represented by the structural formula

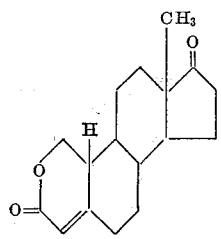

Example 49

By substituting an equivalent of 17α-ethynyl-17β-hydroxy-2-oxaestr-5(10)-en-3-one and otherwise proceeding according to the processes described in Example 47, trans-17α-ethynyl-1,17β-dihydroxy-1,2-seco-A-norestr-3-en-2-oic acid is obtained.

Example 50

The substitution of an equivalent quantity of trans-17α-ethynyl-1,17β-dihydroxy-1,2-seco-A-norestr-3-en-2-oic acid in the procedure of Example 48 results in 17α-ethynyl-17β-hydroxy-2-oxaestr-4-en-3-one of the structural formula

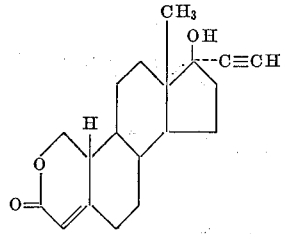

Example 51

By substituting an equivalent quantity of 17β-hydroxy-2-oxa-17α-propynylestr-5(10)-en-3-one and otherwise proceeding according to the processes of Example 47, trans-1,17β-dihydroxy-17α-propynyl-1,2-seco-A-norestr-3-en-2-oic acid is obtained.

Example 52

The substitution of an equivalent quantity of trans-1,17β-dihydroxy-17α-propynyl-1,2-seco-A-norestr-3-en-2-oic acid in the procedure of Example 48 results in 17β-hydroxy-2-oxa-17α-propynylestr-4-en-3-one, characterized by the structural formula

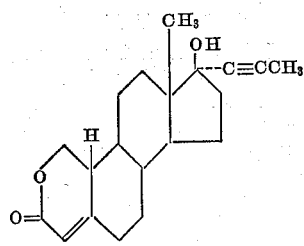

Example 53

To a solution of 1 part of 17α-ethynyl-17β-hydroxy-2-oxaandrostan-3-one in 100 parts of pyridine is added 0.1 part of 5% palladium-on-carbon catalyst, and the resulting mixture is shaken with hydrogen at atmospheric pressure and room temperature until one molecular equivalent of hydrogen is absorbed. The catalyst is then removed by filtration, and the filtrate is diluted with a large quantity of water, then extracted with ether. The ether layer is separated, washed successively with dilute hydrochloric acid and dilute aqueous sodium bicarbonate, then dried over anhydrous sodium sulfate. Removal of the solvent by distillation at reduced pressure affords 17β-hydroxy-2-oxa-17α-vinyl-5α-androstan-3-one of the structural formula

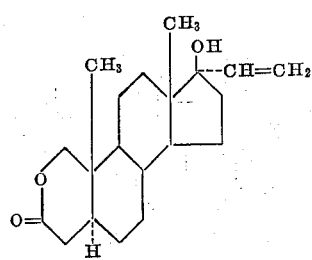

Example 54

The substitution of an equivalent quantity of 17β-hydroxy-2-oxa-17α-propynylestr-5(10)-en-3-one, in the procedure of Example 53 results in 17β-hydroxy-2-oxa-17α-propenylestr-5(10)-en-3-one, represented by the structural formula

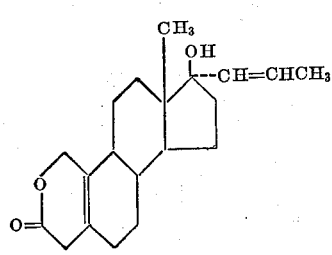

What is claimed is:
1. A member selected from the class consisting of compounds of the formulas

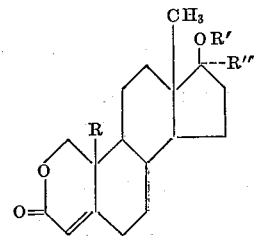

and

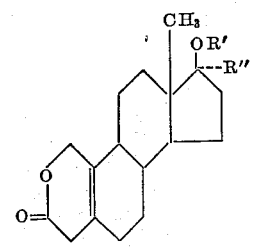

and

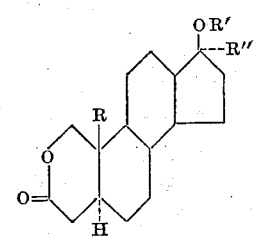

wherein R is selected from the group consisting of hydrogen and the methyl radical, R' is a member of the class consisting of hydrogen and radicals of the formula

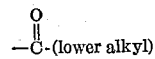

R'' is selected from the group of radicals consisting of lower alkynyl and lower alkenyl, and the dotted lines indicate the optional presence of a double bond between carbon 5 and an adjacent A-ring carbon atom.

2. A compound of the formula

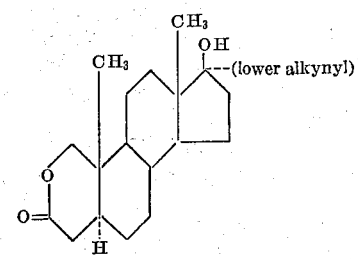

3. 17α-ethynyl-17β-hydroxy-2-oxa-5α-androstan-3-one.

4. A compound of the formula

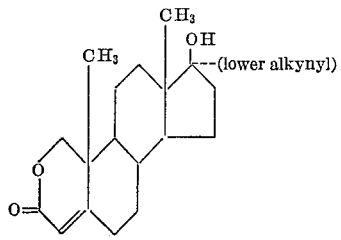

5. 17α-ethynyl-17β-hydroxy-2-oxaandrost-4-en-3-one.

6. A compound of the formula

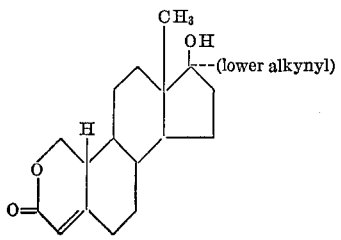

7. 17α-ethynyl-17β-hydroxy-2-oxaestr-4-en-3-one.

8. A compound of the formula

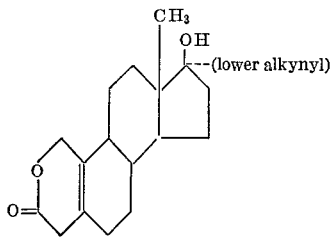

9. 17α-ethynyl-17β-hydroxy-2-oxaestr-5(10)-en-3-one.

References Cited by the Examiner

Pappo et al.: Tetrahedron Letters, No. 9 (1962), pages 365–371.

Fox et al.: Jour. of Clinical Endochrinology and Metabolism, vol. 22 (1962), pages 921–924.

WALTER A. MODANCE, *Primary Examiner.*

JAMES A. PATTEN, *Assistant Examiner.*